United States Patent
French et al.

(10) Patent No.: US 7,804,917 B2
(45) Date of Patent: Sep. 28, 2010

(54) CLEAR CHANNEL ASSESSMENT METHOD AND SYSTEM FOR ULTRA WIDEBAND OFDM

(75) Inventors: Catherine A. French, Olympia, WA (US); Ruoyang Lu, Milpitas, CA (US); Hung C. Nguyen, San Jose, CA (US)

(73) Assignee: Sigma Designs, Inc., Milpitas, CA (US)

( * ) Notice: Subject to any disclaimer, the term of this patent is extended or adjusted under 35 U.S.C. 154(b) by 1038 days.

(21) Appl. No.: 11/532,097

(22) Filed: Sep. 14, 2006

(65) Prior Publication Data

US 2007/0121705 A1 May 31, 2007

Related U.S. Application Data

(60) Provisional application No. 60/734,525, filed on Nov. 7, 2005.

(51) Int. Cl.
*H03K 9/00* (2006.01)
*H04L 27/00* (2006.01)

(52) U.S. Cl. .............. 375/316; 375/238; 375/239; 375/242; 375/286; 375/353; 455/132; 455/134; 455/150.1; 455/161.3; 329/311; 329/300; 329/304; 332/106; 370/202; 370/212; 370/213

(58) Field of Classification Search .................. None
See application file for complete search history.

(56) References Cited

U.S. PATENT DOCUMENTS

| | | | |
|---|---|---|---|
| 6,792,041 B1 * | 9/2004 | Kim et al. ................ 375/225 |
| 7,403,539 B1 * | 7/2008 | Tang et al. ............... 370/445 |
| 2005/0036571 A1 * | 2/2005 | Shvodian et al. .......... 375/316 |
| 2006/0030267 A1 * | 2/2006 | Bhardwaj et al. ........ 455/63.1 |
| 2006/0159003 A1 * | 7/2006 | Nanda et al. ............. 370/203 |
| 2006/0251154 A1 * | 11/2006 | Ettorre et al. ............ 375/148 |
| 2007/0140104 A1 * | 6/2007 | Lim et al. ................ 370/208 |
| 2008/0144628 A1 * | 6/2008 | Tsai et al. ............... 370/392 |
| 2008/0192810 A1 * | 8/2008 | Razzell et al. ........... 375/150 |
| 2009/0285116 A1 * | 11/2009 | Nanda et al. ............. 370/252 |
| 2010/0046770 A1 * | 2/2010 | Chan et al. ............... 381/92 |

OTHER PUBLICATIONS

Heiskala, J., and J. Terry, OFDM Wireless LANs: A Theoretical and Practical Guide, SAMS Publishing, Indianapolis, Indiana, 2002, pp. 81-82.

* cited by examiner

*Primary Examiner*—Shuwang Liu
*Assistant Examiner*—Gina McKie
(74) *Attorney, Agent, or Firm*—Aaron Wininger; Perkins Coie LLP

(57) ABSTRACT

An ultra-wideband clear channel assessment system uses a double-window energy technique for energy detection, which indicates a clear or busy channel.

13 Claims, 4 Drawing Sheets

CLEAR CHANNEL ASSESSMENT METHOD AND SYSTEM FOR ULTRA WIDEBAND OFDM

PRIORITY REFERENCE TO PRIOR APPLICATIONS

This application claims benefit of and incorporates by reference U.S. patent application Ser. No. 60/734,525, entitled "CLEAR CHANNEL ASSESSMENT METHOD FOR ULTRA WIDEBAND OFDM SYSTEM," filed on Nov. 7, 2005, by inventors Catherine A. FRENCH et al.

TECHNICAL FIELD

This invention relates generally to wireless transceivers, and more particularly, but not exclusively, provides a system and method for clear channel assessment for ultra wideband (UWB) orthogonal frequency division multiplexing (OFDM).

BACKGROUND

Wired and wireless communication systems such as local area networks and personal area networks utilize a clear channel assessment (CCA) protocol to test for a busy or clear channel prior to initiating a transmission. Prior art methods for CCA can be broadly classified as energy detection methods and carrier sense methods. Energy detection, as the name implies, measures only energy and does rely on any other signal characteristics for detection. Carrier sense, on the other hand, utilizes some intrinsic signal property in the detection process. For example, a typical carrier sense method might use correlation with a known pattern to detect a signal preamble if present.

A physical layer (PHY) standard for multiband-OFDM (MB-OFDM) was developed by an industry consortium called the WiMedia Alliance. This standard was proposed for IEEE 802.15.3a Personal Area Networks and can be found on the WiMedia Alliance website: www.wimedia.org. The WiMedia standard leaves the details of CCA implementation up to the implementer. For this reason, a robust CCA system and method are needed for this application.

SUMMARY

Embodiments of the present invention introduce an enhanced energy detection method based on a double-energy window. The double-energy window is applied as a CCA method to detect the difference in energy that occurs at the start of each symbol in the ultra wideband orthogonal frequency division multiplexed (OFDM) system proposed by the WiMedia Alliance for the standard, IEEE 802.15.3a Personal Area Networks. By sensing energy difference rather than absolute energy, and by employing a method of adapting the energy difference threshold based on received energy level, embodiments of the present invention achieve robust performance over a variety of channel conditions, including variations in gain, channel impulse response, and signal-to-noise ratio. Because of its robustness to gain variation, the new technique is particularly suited to systems that employ digital automatic gain control, where CCA may need to be performed prior to engaging the gain control.

The method is also able to distinguish between different users in the WiMedia proposed standard. Specifically, multiple users are allowed in the standard via multiple frequency hopping patterns, as shown in Table 1. The table lists the seven mandatory channels, 9-15, and their corresponding time frequency codes (TFCs), which determine the frequency hopping patterns for multiuser communications. The Media Access Control (MAC) layer will indicate to the Physical (PHY) layer that a clear channel assessment is desired, and will specify which channel from Table 1 to test. The PHY will then perform CCA in that channel starting in the band shown in the far right column of the table.

TABLE 1

Channel Information for Mandatory Channels in WiMedia Standard

| Channel Number | TFC | Frequency Hopping Pattern | | | | | | Initial Band Number |
|---|---|---|---|---|---|---|---|---|
| 9  | 1 | 1 | 2 | 3 | 1 | 2 | 3 | 1 |
| 10 | 2 | 1 | 3 | 2 | 1 | 3 | 2 | 1 |
| 11 | 3 | 1 | 1 | 2 | 2 | 3 | 3 | 1 |
| 12 | 4 | 1 | 1 | 3 | 3 | 2 | 2 | 1 |
| 13 | 5 | 1 | 1 | 1 | 1 | 1 | 1 | 1 |
| 14 | 6 | 2 | 2 | 2 | 2 | 2 | 2 | 2 |
| 15 | 7 | 3 | 3 | 3 | 3 | 3 | 3 | 3 |

The CCA method in the present invention uses energy difference to test for two consecutive OFDM symbols, and then begins hopping according to the hopping pattern for the channel being tested. Once hopping commences, $N_1$ out of $N_2$ symbols must be detected (using the energy difference method) in order for the channel to be called "busy". If fewer than $N_1$ symbols are detected, the channel is marked "clear". Thus, if a transmission occurs on a channel with a different hopping pattern than the one being tested, the channel being testing will be marked as "clear" as is desirable.

The energy difference CCA method in embodiments of the present invention can be used on its own or in combination with other methods, such as the preamble correlation method implemented in a typical receiver. The use of the two algorithms in concert provides added robustness. Specifically, the preamble correlation method is generally the most reliable, but it is only useful at the start of a packet where a known preamble occurs. It is not effective mid-packet. On the other hand, the energy difference method is generally less reliable than preamble detection, but can be used at any position within the packet. The present invention uses both methods, with the choice of method programmable by the user or based on the mode of the receiver (i.e., ready mode, receive mode, etc.).

In an embodiment of the invention, a system comprises a double-energy window module capable of detecting a difference in energy that occurs at the start of each symbol and using the difference to determine if a channel is clear.

In an embodiment of the invention, a method comprises using a double-energy window to detect a difference in energy that occurs at the start of each symbol; and determining if a channel is clear based on the difference.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
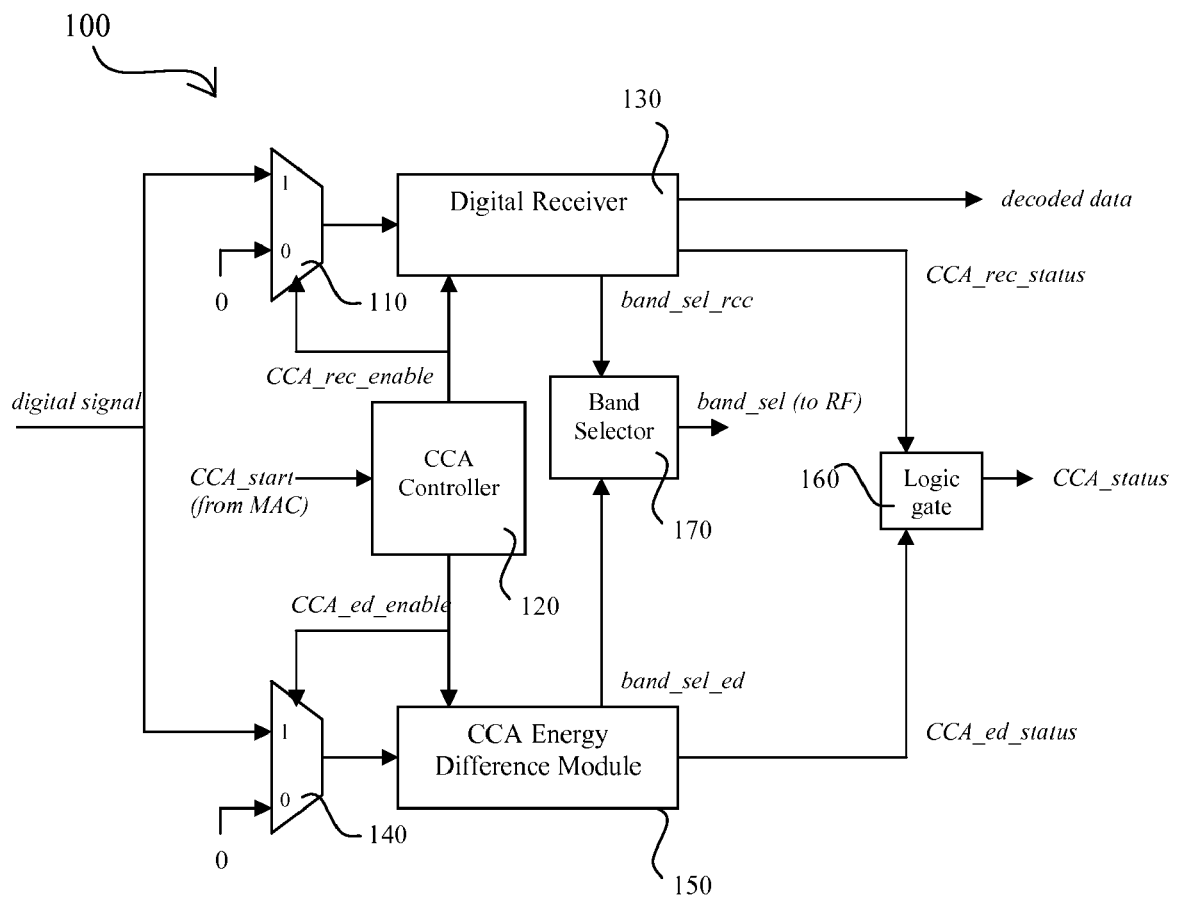
FIG. 1 is a block diagram illustrating an embodiment of a CCA system.

FIG. 1 is a block diagram illustrating an embodiment of a CCA system 100. A digital signal, which can be real or complex, enters a multiplexer (MUX) 110 that selects between the incoming signal and zero depending on the control signal, CCA_rec_enable, coming from a CCA controller 120. The output of the MUX 110 is coupled to a digital receiver 130 that detects and decodes the user data and, at substantially the same time, produces a CCA status signal, CCA_rec_status. When the digital receiver 130 is processing what it believes to be a valid packet, it sets CCA_rec_status high to indicate that the channel is in use. One example of a digital receiver 130 that could be used as part of this invention can be found in U.S. patent application Ser. No. 11/467,914, filed Aug. 28, 2006, which is hereby incorporated by reference. The incoming digital signal also enters a second MUX 140 that selects between the incoming signal and zero depending on a second control signal, CCA_ed_enable, coming from the CCA controller 120. The output of the MUX 140 is coupled to a CCA energy difference module 150 (e.g., a double-window energy module) that produces a second CCA status signal, CCA_ed_status. The module 150 will be discussed in further detail below in conjunction with FIG. 2. The CCA status signals from the energy difference module 150 and the digital receiver 130 enter a logic gate 160, typically an OR gate, to produce the final status signal, CCA_status. This signal is sent back to the Media Access Control (MAC) layer to indicate either a clear channel (CCA_status=0) or a busy channel (CCA_status=1). The MAC (external to this invention) communicates through the CCA controller 120 when it desires a clear channel assessment. The CCA controller 120 determines whether to use the digital receiver 130 or the CCA energy difference module 150 or both when performing an assessment, and communicates this choice through the enable signals, CCA_rec_enable and CCA_ed_enable. Whether to use the receiver 130 and/or the energy difference module 150 for CCA can be made programmable by the user, or it can be determined based on the current mode of the device. For example, the device could be designed to use the digital receiver 130 for CCA while in RECEIVE mode because the receiver 130 is on already in this mode, and then use the CCA energy difference module 150 in READY mode to save power in that mode. Alternatively, both methods could be enabled for all assessment requests by the MAC regardless of mode in order to achieve the best CCA reliability. If enabled, the digital receiver 130 and the CCA energy difference module 150 each produce a band control signal, band_sel_rec and band_sel_ed, respectively. These signals enter a band selector 170 that arbitrates between the two signals to produce a single hopping signal, band_sel, to be used locally and by the analog radio frequency (RF) portion of the receiver.

Figure 2:
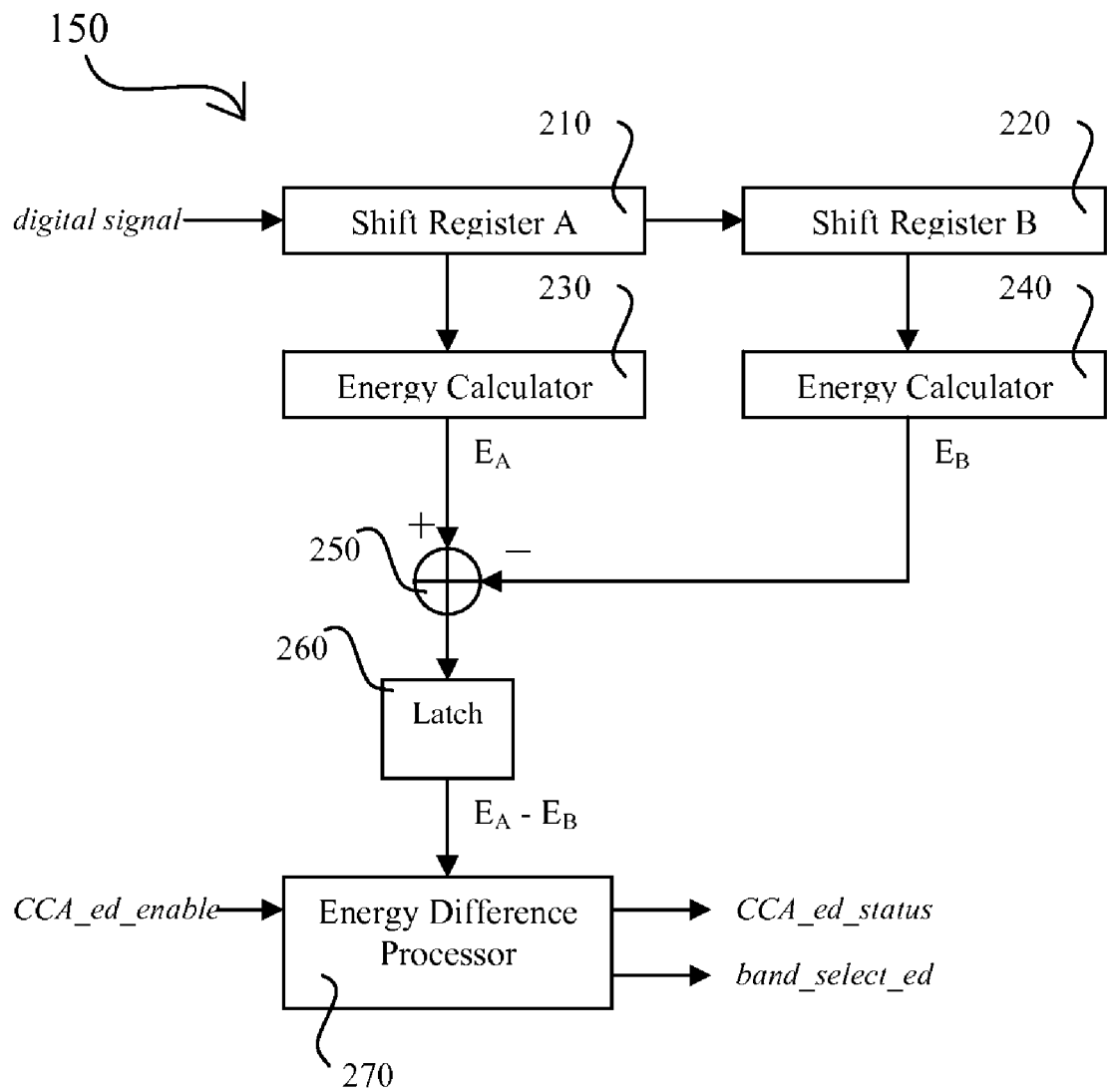
FIG. 2 is a block diagram illustrating an energy difference module of the CCA system of FIG. 1.

FIG. 2 is a block diagram illustrating the energy difference module 150 according to an embodiment of the present invention. An incoming digital signal enters shift register A 210, the output of which feeds directly into shift register B 220. Registers A and B are substantially identical, and together constitute the double-energy window of the present invention. Registers A and B each contains $N_{Reg}$ samples of digital data, where $N_{Reg}$ can be any number less than or equal to 37, which is the number of zeros between non-zero samples in each OFDM symbol. Typically, $N_{Reg}$ is 36, and each of the 36 samples is a complex signed fraction. The contents of registers A and B enter energy calculators 230, 240 that compute the energy contained in each register. The energy values are subtracted 250 and then latched by the latch 260. The latch 260 is coupled to an energy difference processor 270, which uses the energy difference, $E_A$-$E_B$, to determine whether the channel is clear or busy. The energy difference processor 270 then sets the control signals CCA_ed_status and band_sel_ed accordingly.

Figure 3:
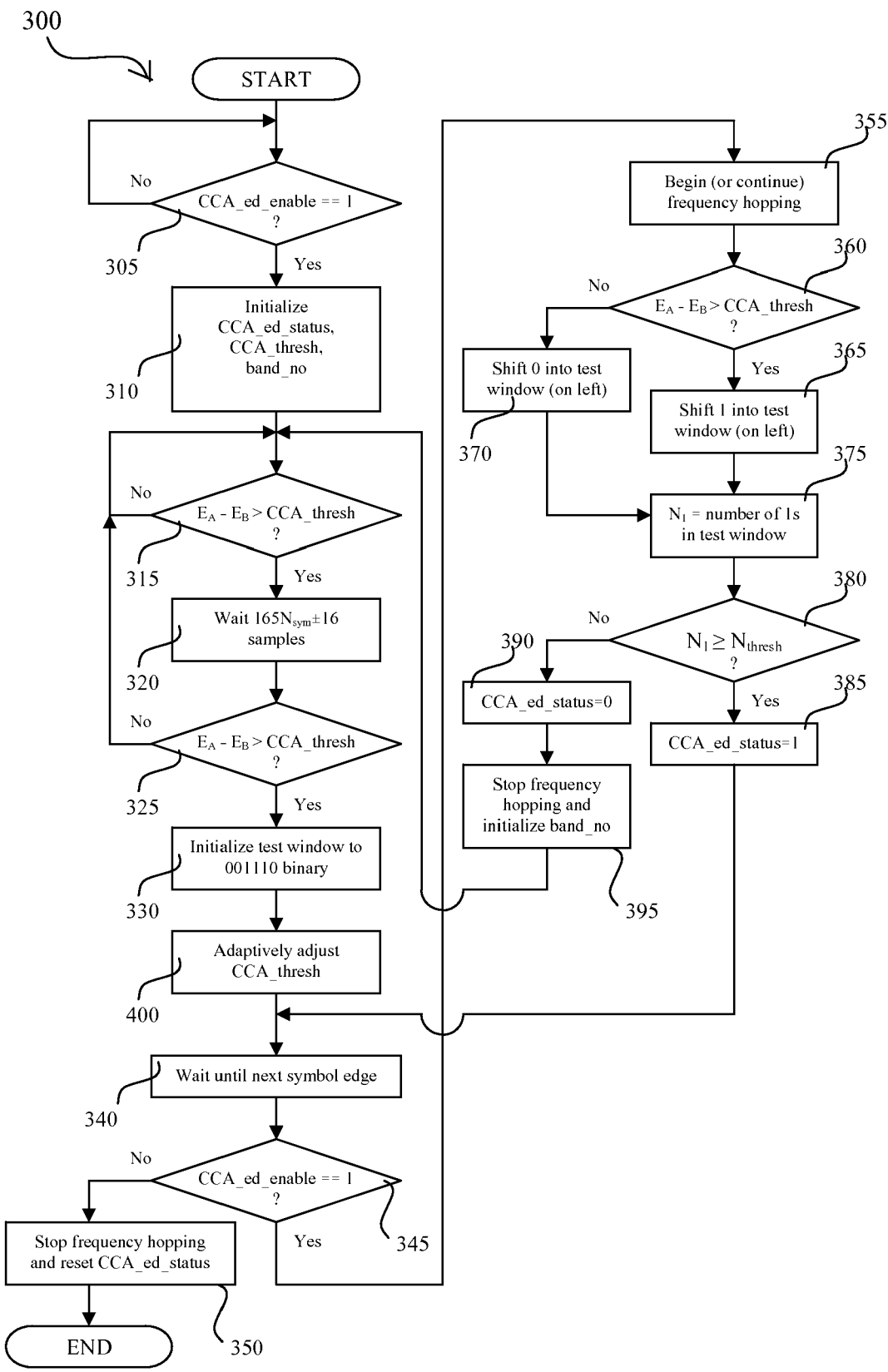
FIG. 3 is a flowchart illustrating a method 300 of processing energy difference to determine channel status.

FIG. 3 is a flowchart illustrating a method 300 of processing energy difference to determine channel status. In an embodiment of the invention, the energy difference processor 270 performs the method 300. The method 300 begins with a test 305 to see if the energy difference module 150 is enabled. If so, several signals are initialized 310. CCA_ed_status is typically set to 0 to indicate a clear channel at the start, but it could alternatively be initialized to 1 if it is desired that "busy" is the default status. CCA_thresh is typically set to 3, assuming that register A contains 36 complex samples and the samples are signed fractional numbers, and band_no is set to the initial band number for the TFC in use as shown in the far right column of Table 1. Next, the energy difference, $E_A$-$E_B$ is compared 315 to the threshold, CCA_thresh on each clock cycle. The idea is that, when $E_A$-$E_B$ becomes large, $E_B$ likely contains mostly zero-padded samples between OFDM symbols, indicating that a symbol edge has occurred. If the energy difference is smaller than CCA_thresh, the threshold test it is repeated 315, otherwise the processor waits 320 approximately $N_{sym}$ symbols and then tests 325 for a second threshold crossing. Here, $N_{sym}$ is the number of symbols between the first symbol in a packet and the next symbol in the packet that is in the same band. For TFCs greater than 2, $N_{sym}$=1, otherwise $N_{sym}$=3. If the second threshold crossing test 325 fails, the processor returns to checking 315 for a first threshold crossing on every clock. If the second threshold crossing 325 occurs, the processor initializes 330 a test window where each bit represents a threshold crossing for one symbol. Here we show a test window of length 6 symbols, with an initial value of 001110. The next operation, which is optional in one embodiment, is to adaptively compute 400 a new threshold value, CCA_thresh, based on some measured parameter such as energy. Adaptive adjustment is not a requirement, but a wider range of gains and signal-to-noise ratios can be accommodated if the CCA threshold is adjusted once each time that hopping is initiated. The processor then waits 340 until the next symbol edge before proceeding. At this point the method 300 shows a test 345 to see if the energy difference module 150 is still enabled. If not enabled, the operation resets the CCA_ed_status and stops frequency hopping if it had started hopping 350. The operation then ends. This test 345 for CCA_ed_enable is shown at this point in the method 300 for illustrative purposes, but the test actually occurs throughout the method 300 so that the operation can end any time that CCA_ed_enable goes low. If the energy difference module 150 is still enabled, the processor proceeds to initiate frequency hopping or continue if already hopping 355. With hopping started, the processor checks 360 for another threshold crossing at the symbol edge after hopping has started. If this threshold crossing occurs, a 1 is shifted 365 into the test window from the left. For example, if we start with the initial window 001110, we would then have 100111 after the threshold crossing after hopping 360 occurs. If the first threshold crossing after hopping 360 does not occur, a 0 is shifted 370 into the test window from the left. Whether or not a threshold crossing occurs after hopping, the number of 1s in the test window (which is equal to the number of threshold crossings in the last 6 symbols) is counted and stored 375 in $N_1$. The number of 1s in the test window, $N_1$, is compared 380 to a threshold, typically $N_{thresh}$=4 for a test window of size 6. If $N_1 \geq N_{thresh}$, then CCA_ed_status is set 385 to 1 to indicate a busy channel, and the operation proceeds 340 to the next symbol edge. If $N_1$ does not cross the threshold, then CCA_ed_status is set 390 to 0 to indicate a clear channel, the frequency hopping is halted 395, and the operation returns to looking 315 for an energy difference threshold crossing on any clock. An additional feature that can be added to this operation is to hold CCA_ed_status high for a fixed number of clocks after the channel appears clear in order to keep CCA_ed_status from going low between packets that are very close together, such as those sent in burst mode.

Figure 4:
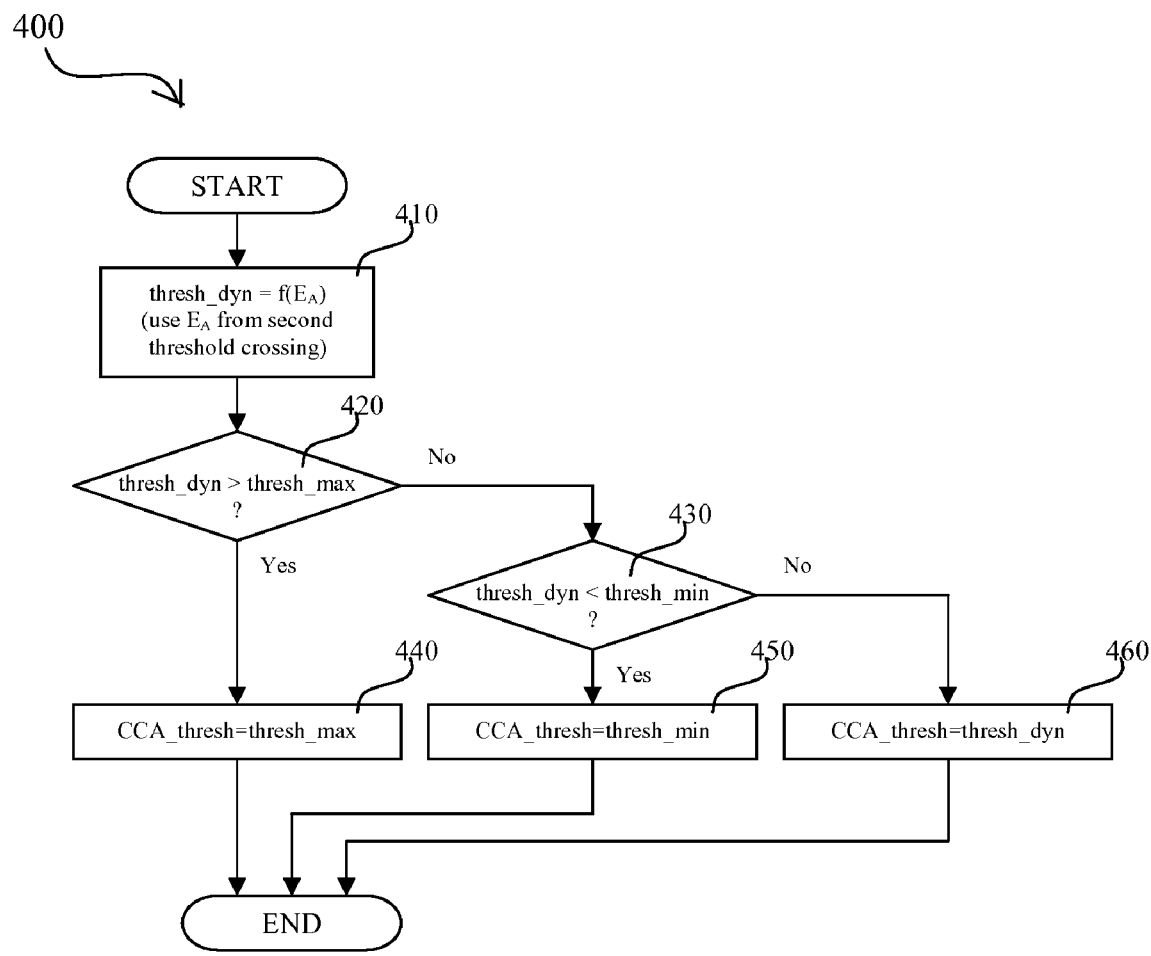
FIG. 4 is a flowchart illustrating a method of adaptively adjusting a CCA threshold.

FIG. 4 is a flowchart illustrating a method 400 of adaptively adjusting a CCA threshold. The operation begins when a temporary threshold value, thresh_dyn, is set 410 equal to a function of $E_A$, where $E_A$ is the energy in register A 210 inside the energy difference module 150. This energy should be captured at the time of the second energy threshold crossing 325. A typical function would be $f(E_A)=E_A/2$. Next, the value of thresh_dyn is compared 420, 430 to both a maximum value, thresh_max, and a minimum value, thresh_min. If thresh dyn is greater than thresh_max, then CCA_thresh is set 440 equal to thresh_max. If thresh-dyn is less than thresh_min, then CCA_thresh is set 450 equal to thresh_min. If thresh_dyn is between thresh_max and thresh_min, then CCA_thresh is set 460 equal to thresh_dyn. The values of thresh_max and thresh_min can be made programmable or can be fixed. Typical values would 7 and 1, respectively, assuming that register A contains 36 complex samples and the samples are signed fractional numbers.

The foregoing description of the illustrated embodiments of the present invention is by way of example only, and other variations and modifications of the above-described embodiments and methods are possible in light of the foregoing teaching. For example, embodiments of the invention can be used with other technologies besides UWB OFDM. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A clear channel assessment system, comprising:
a double-energy window module capable of receiving a digital signal at a first frequency, the digital signal having a plurality of symbols, and detecting a difference in energy that occurs at the start of each symbol and using the difference to determine if a channel is clear; the module comprising:
a first shift register capable of receiving the digital signal;
a second shift register, coupled to the first shift register, capable of receiving output of the first shift register;
a first energy calculator, coupled to the first shift register, capable of calculating an energy of the first register;
a second energy calculator, coupled to the second shift register, capable of calculating an energy of the second shift register;
an adder, coupled to the first energy calculator and the second energy calculator, capable of determining a difference in energy of the first and second registers;
a latch, coupled to the adder, capable of latching the difference in energy; and
an energy difference processor, coupled to the latch, capable of determining if a channel is busy based on the latched energy difference by
comparing the latched energy difference to a threshold on each clock cycle of a plurality of clock cycles;
repeating the comparing if the latched energy difference is less than the threshold;
waiting and then repeating the comparing if the latched energy difference is greater than the threshold;
returning to the comparing if the repeated comparing is not greater than the threshold;
hopping to another frequency and comparing the latched energy difference to the threshold at the other frequency; and
repeating the hopping and comparing;
wherein a channel is busy if the energy difference is greater than the threshold across a plurality of frequencies.

2. The system of claim 1, wherein the plurality of frequencies includes 4 frequencies when energies are compared in 6 frequencies.

3. The system of claim 1, wherein the threshold is adaptively adjusted based on energy in the first shift register.

4. The system of claim 3, wherein the threshold is equal to half the energy in the first shift register when the half is between a minimum and maximum threshold.

5. The system of claim 1, further comprising:
a digital receiver capable of using a preamble correlation method to determine if a channel is busy; and
an OR gate coupled to the receiver and the module.

6. A UWB transceiver incorporating the system of claim 1.

7. A method, comprising:
using a double-energy window to receive a digital signal at a first frequency, the digital signal having a plurality of symbols, and detect a difference in energy that occurs at the start of each symbol; and
determining if a channel is clear based on the difference in energy, the using and determining comprising
storing the digital signal in a first shift register;
storing output of the first shift register in a second shift register;
calculating the energy of the first register and the second register;
determining the difference in energy in the registers;
latching the difference in energy; and
determining if a channel is busy based on the latched energy difference by
comparing the latched energy difference to a threshold on each clock cycle of a plurality of clock cycles:
repeating the comparing if the latched energy difference is less than the threshold;
waiting and then repeating the comparing if the difference is greater than the threshold;
returning to the comparing if the repeated comparing is not greater than the threshold;
hopping to another frequency and comparing the latched energy difference to the threshold at the other frequency; and
repeating the hopping and comparing;
wherein a channel is busy if the latched energy difference is greater than the threshold across a plurality of frequencies.

8. The method of claim 7, wherein the plurality of frequencies includes 4 frequencies when energies are compared in 6 frequencies.

9. The method of claim 7, further comprising adaptively adjusting the threshold based on energy in the first shift register.

10. The method of claim 9, wherein the threshold is equal to half the energy in the first shift register when the half is between a minimum and maximum threshold.

11. The method of claim 7, further comprising: determining if a channel is busy using a preamble correlation method.

12. The method of claim 7, wherein the method is performed in a UWB transceiver.

13. A system, comprising: means for using a double-energy window to receive a digital signal at a first frequency, the digital signal having a plurality of symbols, and detect a difference in energy that occurs at the start of each symbol; and means for determining if a channel is clear based on the difference in energy, the means for using and determining comprising means for storing the digital signal in a first shift register;

means for storing output of the first shift register in a second shift register;

means for calculating the energy of the first shift register and the second shift register;

means for determining the difference in energy in the registers;

means for latching the difference in energy; and means for determining if a channel is busy based on the latched energy difference by comparing the latched energy difference to a threshold on each clock cycle of a plurality of clock cycles:

repeating the comparing if the latched energy difference is less than the threshold;

waiting and then repeating the comparing if the latched energy difference is greater than the threshold;

returning to the comparing if the repeated comparing is not greater than the threshold;

hopping to another frequency and comparing the latched energy difference to the threshold at the other frequency; and repeating the hopping and comparing;

wherein a channel is busy if the latched energy difference is greater than the threshold across a plurality of frequencies.

\* \* \* \* \*